United States Patent
Hamann et al.

(10) Patent No.: US 9,471,884 B2
(45) Date of Patent: Oct. 18, 2016

(54) MULTI-MODEL BLENDING

(71) Applicant: International Business Machines Corporation, Armonk, NY (US)

(72) Inventors: Hendrik F. Hamann, Yorktown Heights, NY (US); Youngdeok Hwang, White Plains, NY (US); Theodore G. van Kessel, Millbrook, NY (US); Ildar K. Khabibrakhmanov, Syosset, NY (US); Siyuan Lu, Yorktown Heights, NY (US); Ramachandran Muralidhar, Mahopac, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 323 days.

(21) Appl. No.: 14/291,720

(22) Filed: May 30, 2014

(65) Prior Publication Data

US 2015/0347922 A1    Dec. 3, 2015

(51) Int. Cl.
*G06F 15/18*    (2006.01)
*G06N 99/00*    (2010.01)

(52) U.S. Cl.
CPC .................................. *G06N 99/005* (2013.01)

(58) Field of Classification Search
USPC ........................................................... 706/12
See application file for complete search history.

(56) References Cited

U.S. PATENT DOCUMENTS

| | | | | |
|---|---|---|---|---|
| 8,244,502 B2* | 8/2012 | Hamann | ............ | H05K 7/20836 703/1 |
| 8,306,794 B2* | 11/2012 | Hamann | ................. | G06F 1/206 703/5 |
| 8,594,985 B2* | 11/2013 | Hamann | ............. | G06F 17/5009 703/2 |
| 8,630,724 B2* | 1/2014 | Hamann | ................ | G05B 13/04 700/12 |
| 8,718,939 B2* | 5/2014 | Hamann | ............ | G01N 33/1886 367/131 |
| 8,731,883 B2* | 5/2014 | Hamann | ................ | G06F 1/206 703/5 |
| 8,849,630 B2* | 9/2014 | Amemiya | ............... | G06F 1/206 703/14 |
| 8,949,040 B2* | 2/2015 | Chey | .................. | H05K 7/20745 702/34 |
| 9,109,989 B2* | 8/2015 | Hamann | ................ | G01N 17/04 |
| 9,229,132 B2* | 1/2016 | Guha | ...................... | G01W 1/10 |

(Continued)

OTHER PUBLICATIONS

Fault Diagnosis for Batch Processes Using Multi-model FDA with Moving Window Liying Jiang; Libo Liang; Chengbo Li 2005 International Conference on Neural Networks and Brain Year: 2005, vol. 1 pp. 564-568, DOI: 10.1109/ICNNB.2005.1614676 IEEE Conference Publications.*

(Continued)

*Primary Examiner* — Michael B Holmes
(74) *Attorney, Agent, or Firm* — Cantor Colburn LLP; Vazken Alexanian

(57) ABSTRACT

A method and a system to perform multi-model blending are described. The method includes obtaining one or more sets of predictions of historical conditions, the historical conditions corresponding with a time T that is historical in reference to current time, and the one or more sets of predictions of the historical conditions being output by one or more models. The method also includes obtaining actual historical conditions, the actual historical conditions being measured conditions at the time T, assembling a training data set including designating the two or more set of predictions of historical conditions as predictor variables and the actual historical conditions as response variables, and training a machine learning algorithm based on the training data set. The method further includes obtaining a blended model based on the machine learning algorithm.

20 Claims, 6 Drawing Sheets

(56) References Cited

U.S. PATENT DOCUMENTS 9,258,932 B2 * 2/2016 Hamann ............ H05K 7/20836
2014/0324350 A1 10/2014 Hamann et al.
2014/0324352 A1 10/2014 Hamann et al.

OTHER PUBLICATIONS

A novel virtual age reliability model for Time-to-Failure prediction Yao Wang; Sorin Cotofana 2010 IEEE International Integrated Reliability Workshop Final Report Year: 2010 pp. 102-105, DOI: 10.1109/IIRW.2010.5706498 IEEE Conference Publications.*

A path prediction model to support mobile multimedia streaming Apollinaire Nadembega; Abdelhakim Hafid; Tarik Taleb 2012 IEEE International Conference on Communications (ICC) Year: 2012 pp. 2001-2005, DOI: 10.1109/ICC.2012.6364149 IEEE Conference Publications.*

A resource prediction model for virtualization servers Sayanta Mallick; Gaëtan Hains; Cheikh Sadibou Deme High Performance Computing and Simulation (HPCS), 2012 International Conference on Year: 2012 pp. 667-671, DOI: 10.1109/HPCSim.2012.6266990 IEEE Conference Publications.*

List of IBM Patents or Patent Applications Treated as Related; (Appendix P), Filed Feb. 4, 2016; 2 pages.

Hendrik F. Hamann et al., "A Situation-Dependent Blending Method for Predicting the Progression of Diseases or Their Responses to Treatments" U.S. Appl. No. 14/967,551, filed Dec. 14, 2015.

List of IBM Patents or Patent Applications Treated as Related; (Appendix P), Filed Jul. 14, 2015; 2 pages.

Hendrik F. Hamann et al., "Parameter-Dependent Model-Blending With Multi-Expert Based Machine Learning and Proxy Sites" U.S. Appl. No. 14/797,777, filed Jul. 13, 2015.

Hendrik F. Hamann et al., "Parameter-Dependent Model-Blending With Multi-Expert Based Machine Learning and Proxy Sites" U.S. Appl. No. 14/798,824, filed Jul. 14, 2015.

Hendrik F. Hamann et al., "Parameter-Dependent Model-Blending With Multi-Expert Based Machine Learning and Proxy Sites" U.S. Appl. No. 14/798,844, filed Jul. 14, 2015.

\* cited by examiner

MULTI-MODEL BLENDING

FEDERAL RESEARCH STATEMENT

This invention was made with Government support under DE-EE0006017 awarded by the Department of Energy. The Government has certain rights to this invention.

BACKGROUND

The present invention relates to forecast models, and more specifically, to multi-model blending.

Physical models are used to forecast conditions in a wide variety of arenas. For example, atmospheric conditions are used by a meteorological model to forecast weather. Weather forecast models include general purpose and application specific models and may include input parameters like pressure, temperature, and wind velocity, for example. As another example, information obtained from inspections, direct measurements, or a combination are used by corrosion models to forecast pipeline corrosion in the oil and gas pipeline field. The input parameters may include, for example, the type of material comprising the pipe and environmental variables (e.g., temperature, gas concentrations, pressure, flow conditions).

SUMMARY

According to one embodiment of the present invention, a method of multi-model blending includes obtaining one or more sets of predictions of historical conditions, the historical conditions corresponding with a time T that is historical in reference to current time, and the one or more sets of predictions of the historical conditions being output by one or more models; obtaining actual historical conditions, the actual historical conditions being measured conditions at the time T; assembling a training data set including designating the one or more set of predictions of historical conditions as predictor variables and the actual historical conditions as response variables; training a machine learning algorithm based on the training data set; and obtaining a blended model based on the machine learning algorithm.

According to another embodiment of the invention, a system to perform multi-model blending includes an input interface configured to receive inputs; a processor configured to obtain one or more sets of predictions of historical conditions based on the inputs, the one or more sets of predictions of the historical conditions being output by respective one or more models, to obtain actual historical conditions, the actual historical conditions being measured conditions at the time T, to assemble a training data set by designating the one or more set of predictions of historical conditions as predictor variables and the actual historical conditions as response variables, and to train a machine learning algorithm based on the training data set; and an output interface configured to output blended output based on a blended model resulting from the machine learning algorithm.

According to yet another embodiment of the invention, a computer program product having computer readable instructions stored thereon which, when executed by a processor, cause the processor to implement a method of multi-model blending. The method includes obtaining one or more sets of predictions of historical conditions, the historical conditions corresponding with a time T that is historical in reference to current time, and the one or more sets of predictions of the historical conditions being output by one or more models; obtaining actual historical conditions, the actual historical conditions being measured conditions at the time T; assembling a training data set including designating the one or more set of predictions of historical conditions as predictor variables and the actual historical conditions as response variables; training a machine learning algorithm based on the training data set; and obtaining a blended model based on the machine learning algorithm.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, a model may be used to forecast or estimate future conditions in any number of areas. In many cases, models may be developed and tested in laboratory settings and may not capture the complexity of actual field situations. When a set of models for estimating the same condition (e.g., weather, corrosion) is considered, each type of model may represent an approach that is valid over a range of experimental (input) parameters. However, none of the types is likely to be accurate in all situations. Embodiments of the systems and methods described herein relate to multi-model blending to facilitate prediction or estimation over a broad range of inputs. Specifically, the embodiments include the development of multi-model blending (a blended model) based on machine learning. In contrast to models that are based on machine learning, the multi-model blending described herein specifically relates to using one or more models (at least one of which is a physical model) and then using machine learning for the blended model. Physical models use laws of physics and chemistry to constrain the relationships between model inputs and outputs. Statistical models, which formalize a relationship between variables in the form of mathematical equations, may also be used as inputs to the blended model.

Figure 1:
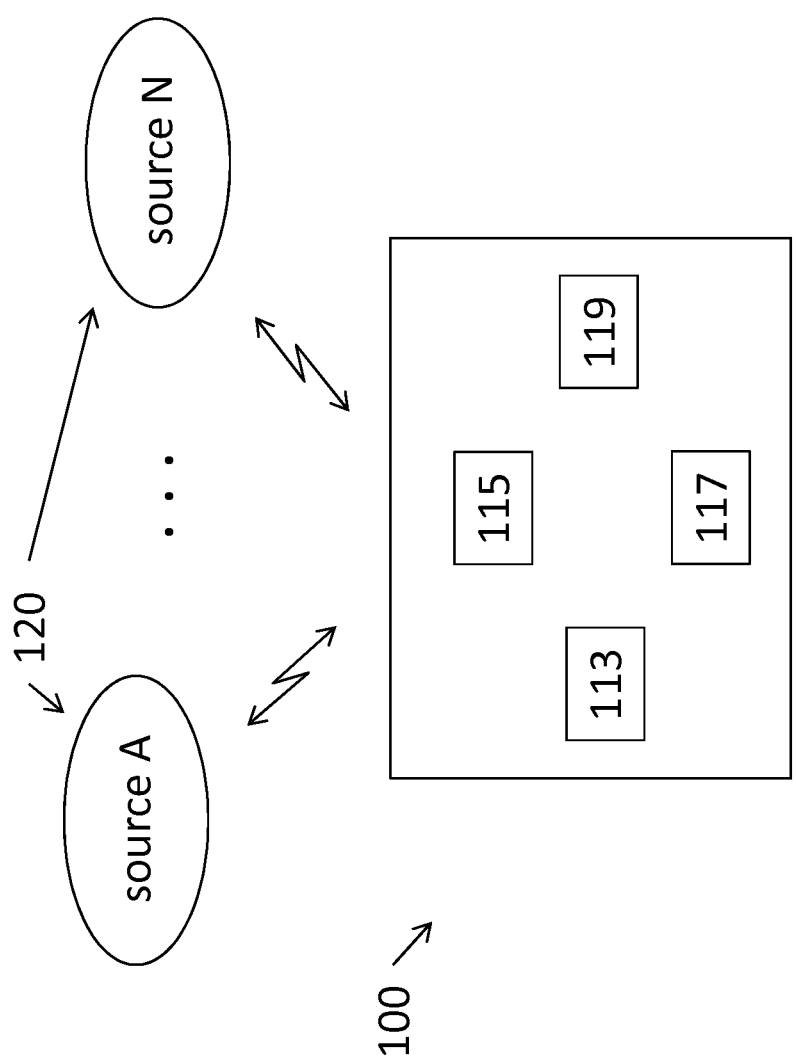
FIG. 1 is an overview of a multi-model blending system according to an embodiment of the invention.

FIG. 1 is an overview of a multi-model blending system 100 according to an embodiment of the invention. The system 100 includes an input interface 113, one or more processors 115, one or more memory devices 117, and an output interface 119. The system 100 may communicate, wirelessly, through the internet, or within a network, for example, with one or more sources 120 (source A ... source N) of model parameters or outputs. For example, in the exemplary case of multi-model blending of meteorological models, source A 120 may be The National Weather Service or another organization that executes a model to forecast weather and provides the model output. The operation of the system 100 is further detailed with reference to FIG. 2. Two exemplary embodiments are specifically discussed. One involves the system 100 both executing one or more models and developing the blended model based on the model outputs while the other involves the system 100 receiving outputs from one or models and developing the blended model.

Figure 2:
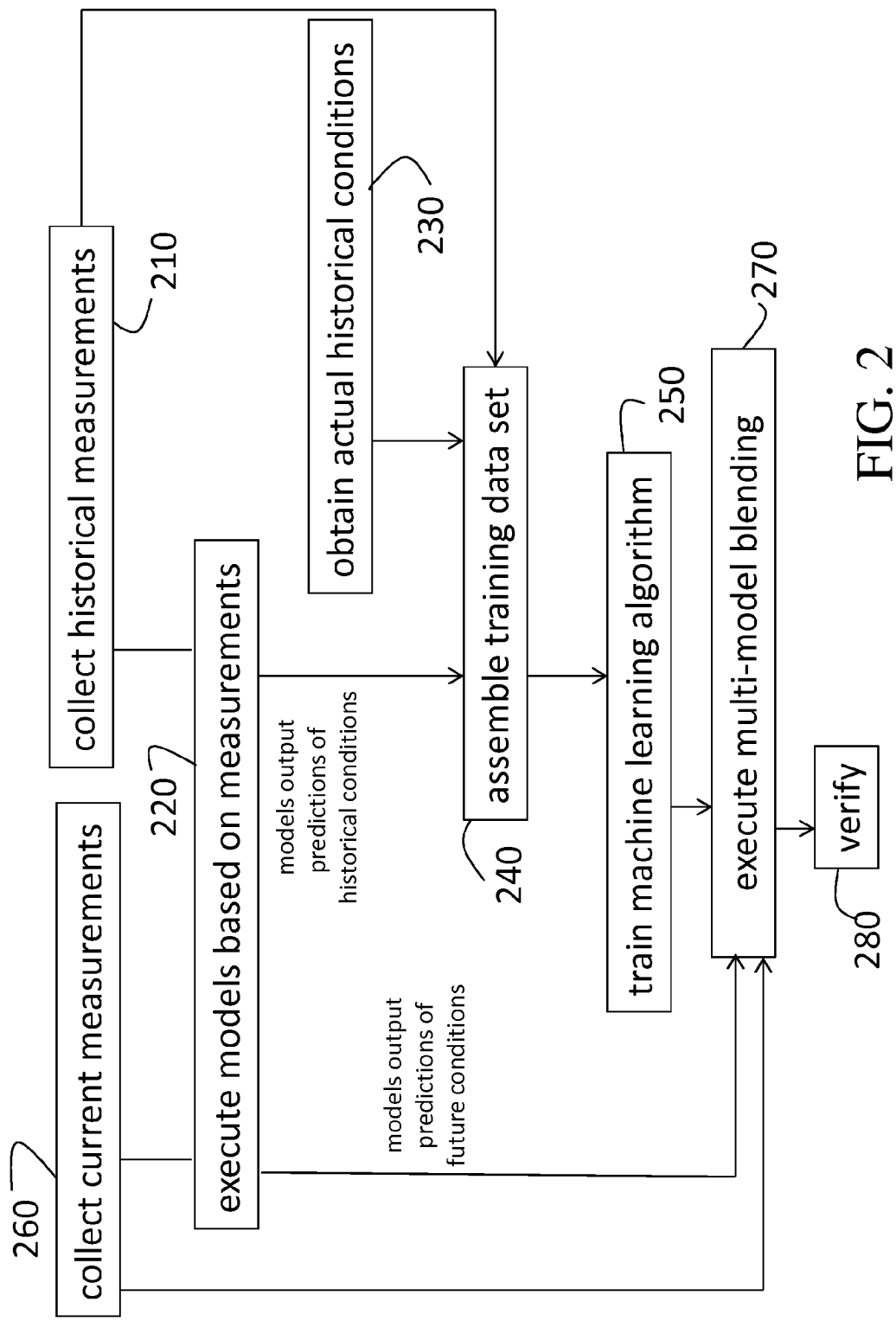
FIG. 2 is a process flow of a method of multi-model blending according to embodiments of the invention.

FIG. 2 is a process flow of a method of multi-model blending according to embodiments of the invention. Collecting historical measurements, at block 210, is a process that is performed according to one embodiment. According to that embodiment, the sources 120 shown in FIG. 1 are sources of the historical measurements. In an exemplary application of the method to weather forecasting, the historical measurements include temperature, pressure, humidity, and wind velocity at some time (t) in the past. Also according to that embodiment, executing one or more models based on the historical measurements (at block 220) is performed by the processor 115 of the system 100 to obtain predictions of historical conditions, explained further below. In an alternate embodiment, the sources 120 provide the predictions of historical conditions (block 220) to the system 100. That is, existing organizations and systems that implement models (block 220) provide the model outputs of predictions of historical conditions to the system 100 such that the system 100 receives outputs from one or more models at the input interface 113. According to alternate embodiments, both historical measurements and resulting predictions of historical conditions may be provided by the sources 120. That is, the system 100 may use not only the outputs of one or more models but also other data that may or may not have been an input to a model. At least one of the one or more models used by the system 100 is a physical model.

The reference to a model is not intended to be limiting in any way. That is, one model may provide more than one set of predictions of historical conditions (block 220) because the same model may operate differently based on a range of values of one or more parameters or conditions. For example, the same corrosion model may operate differently based on the input fluid flow rate. Thus, the single corrosion model may provide two or more sets of outputs for two or more sets of flow rate. According to this embodiment, the blended model may be developed based on output from one model, though two or more sets of outputs (for two or more sets of conditions) would be provided by the model. Moreover, a model may include multiple submodels. For example a corrosion model may model the pitting corrosion propagation rate as a function of several different inputs (e.g., $CO_2$, $H_2S$ partial pressure, temperature, pressure) independently yielding a pitting corrosion rate due to each input (e.g., $H_2S$, temperature). In this case, the model is effectively a combination of the several independent submodels, each of which addresses one input parameter. Thus, the blended model may be generated using the different submodels.

As noted above, embodiments of the invention are not limited based on how the predictions of historical conditions are obtained by the system 100. The predictions of historical conditions refer to model outputs based on the historical measurements (at time t). That is, based on the historical measurements (at a past time t), the models predict conditions (e.g., weather) at some time T that is after the time t (t<T) but is still historical with reference to current time. Thus, the model outputs are predictions of historical conditions with reference to current time. As a result, the actual conditions for that same time (T) are also available. To be clear, the predictions of historical conditions may refer to more than one output of a model (e.g., temperature and rainfall) and are not limited to only the intended prediction of a model (e.g. only rainfall), as further discussed below with reference to FIG. 5. At block 230, obtaining actual historical conditions refers to obtaining the actual (recorded) conditions (recorded at time T). While there is one set of actual historical conditions, there are as many sets of predictions of historical conditions as there are models or operational versions of models (at least two). The actual historical conditions correspond with the predictions of historical conditions. Thus, for example, if one of the models used to obtain the predictions of historical conditions were perfect, the predictions of historical conditions from that perfect model would be identical to the actual historical conditions.

At block 240, assembling a training data set includes designating the predictions of historical conditions as predictor variables and designating the actual historical conditions as response variables. Based on the embodiments discussed above, at least three types of training data sets are possible. The outputs of a single physical model may be used as predictor variables in training data set. The outputs of a number of models (at least one of which is a physical model) may be used as predictor variables in the training data set. The outputs of one or more models (at least one of which is a physical model) may be used in addition to other information (which may be part of the input parameters for one or more models, for example) as predictor variables in the training data set.

At block 250, training a machine learning algorithm based on the predictor variables and the response variables is according to known machine learning processes. Essentially, the actual historical conditions facilitate obtaining a set of weighting coefficients that indicate how well the models worked under different circumstances. The weighting coefficients may be a function of time as well as condition or state. Known machine learning methods that may be used according to various embodiments include supervised learning, unsupervised learning, statistical classification, association rule learning, hierarchical clustering, partitional clustering, reinforcement learning, and deep learning. The machine learning algorithm may be a neural network, linear regression model, generalized additive model, random forest (ensemble method) model, gradient boosted regression model, or supported vector machine model, for example. In addition the machine learning algorithm may be a weighted average of two or more of the algorithms mentioned above.

The output of the machine learning algorithm is the multi-model blending process (a blended model). Once the multi-model blending is available, the set of blocks 260 (collecting current measurements) and block 220 (executing one or more models based on the current measurements) may be processed according to one of the two embodiments discussed above. That is, the sources 120 may provide the current measurements and the executing the one or more models may be performed by the processor 115 of the system 100, or the sources 120 may provide the predictions of future conditions based on executing one or more models on the current measurements. Additionally, as indicated by FIG. 2, the collected measurements may be available to the system 100 in addition to the model outputs. In any case, at block 270, executing the multi-model blending on the outputs of the one or more models provides a blended forecast. At block 280, verifying the blended forecast includes comparing the blended forecast resulting from a validation measurement set with real measurements.

Figure 3:
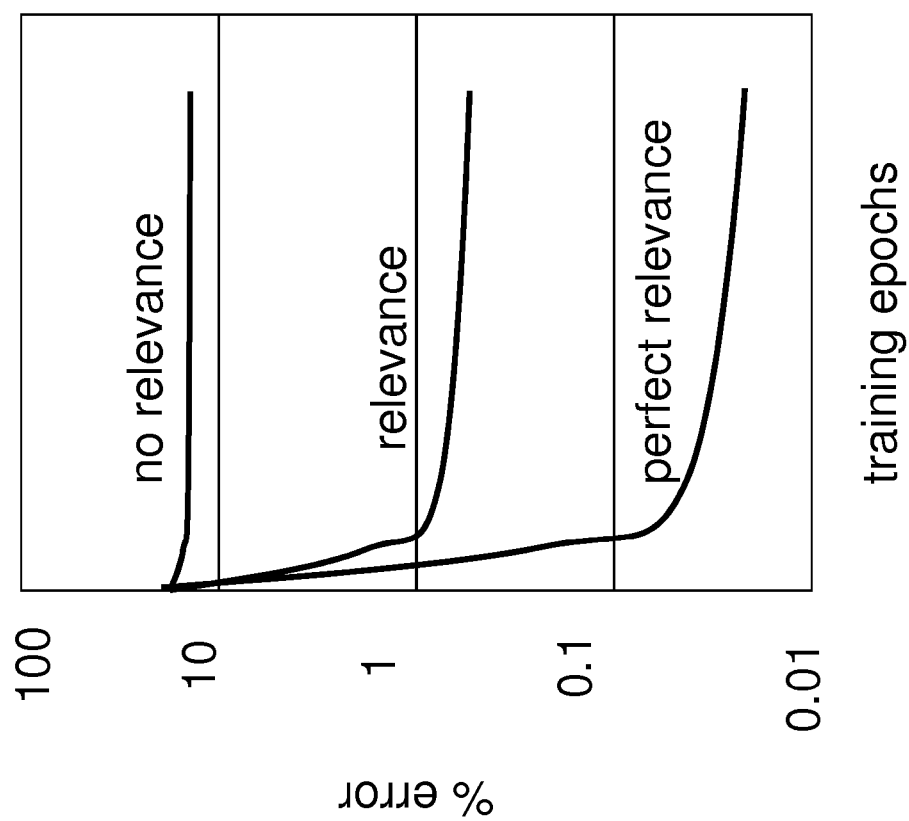
FIG. 3 illustrates training epochs of a machine learning algorithm according to embodiments of the invention.

FIG. 3 illustrates training epochs of a machine learning algorithm according to embodiments of the invention. An epoch refers to each item of the training set (predictor variables or, in this case, predictions of historical conditions (outputs of the models)). The percent of error shown in FIG. 3 indicates the relevance of the model providing the training epoch. That is, as noted above, some models may have a relatively higher accuracy in specified ranges of operation. The training epochs generated by those models in those ranges would be expected to be more relevant, for example. This relevance with a given range of operation is considered by the machine learning algorithm to weight the different models differently in the blending.

Figure 4:
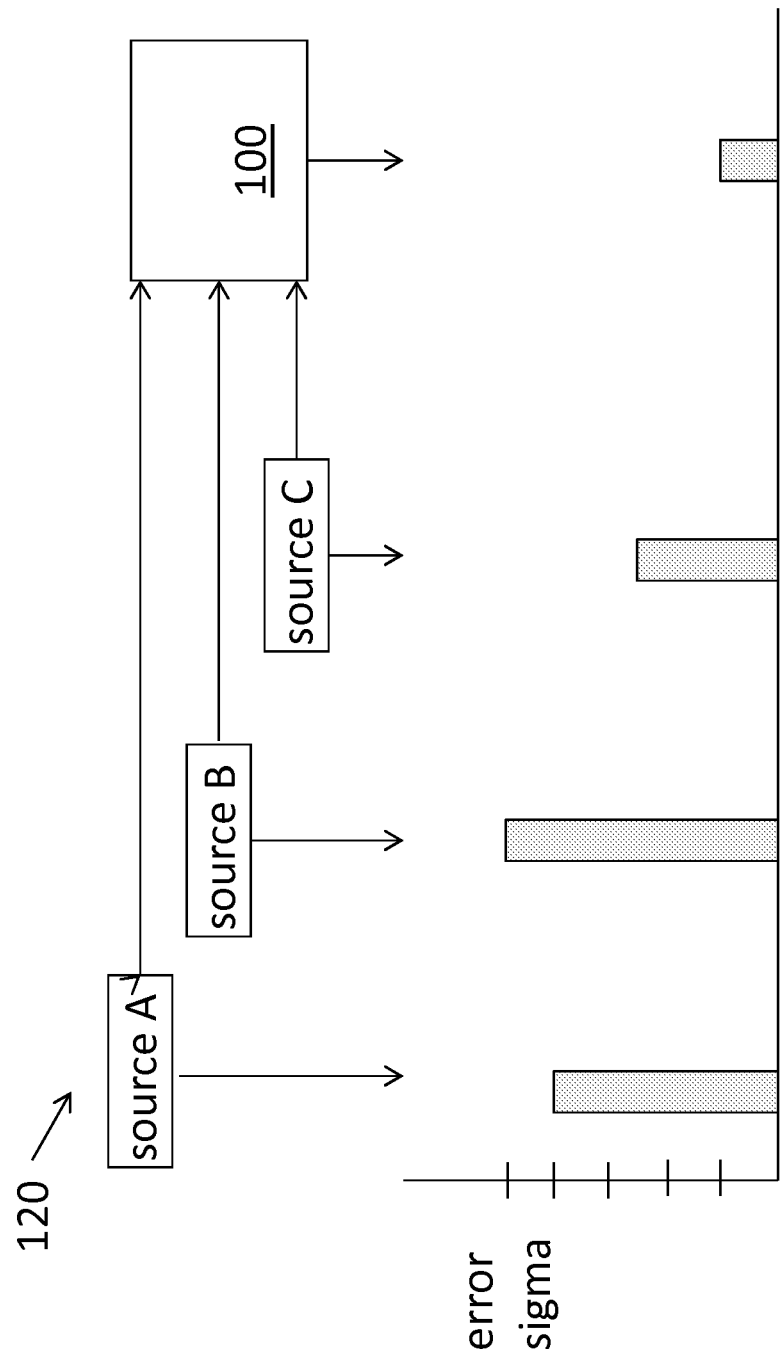
FIG. 4 illustrates multi-model blending of models and a resulting error sigma according to an exemplary embodiment of the invention.

FIG. 4 illustrates multi-model blending of models and a resulting error sigma according to an exemplary embodiment of the invention. In the exemplary embodiment, three meteorological models (sources 120 A, B, C) output their forecasts to the system 100, which outputs a blended output or forecast. As FIG. 4 indicates, the exemplary error sigma (root mean square error from actual values) of the blended forecast is relatively much smaller than the error sigma for the forecasts from the three models. The forecasts may be of temperature, pressure, humidity, wind speed, global solar irradiance, direct normal solar irradiance, accumulated rain, or snow depth, for example. In weather forecasting, four types of physical models that may generally be used are a Eulerian model, Lagrangian model, numerical weather prediction (NWP) model, and climatology model.

At the shortest forecast lead time, the Eulerian model corresponds to using the persistence of the last observation (value of the atmospheric parameter remains constant). The Eulerian model performs best at forecasting periods on the order of minutes or an hour ahead. The Lagrangian model assumes the change (first derivative) of atmospheric parameters to be constant. For example, according to a Lagrangian model, a cloud moves at a constant velocity in space. The Lagrangian projection of cloud position may be used to forecast solar irradiance at a given site, for example, by forecasting when the sun will be blocked by the moving cloud. Like a Eulerian model, a Lagrangian model performs best at forecasting periods on the order of minutes or an hour ahead. The NWP model typically involves solving large scale differential equations depicting the fluid dynamics of the atmosphere. Many different versions of NWP models are run by agencies such as the National Oceanic and Atmospheric Administration (NOAA) and the European Center for Medium Range Weather Forecast (ECMWF), for example. Specific examples of NWP models include rapid refresh (RAP) models, high resolution rapid refresh (HRRR) models, North American (NAM) models, and global forecast system (GFS) models. While the accuracy of NWP models tends to be less than that of Eulerian and Lagrangian models for the shortest lead times, accuracy remains reasonable for durations on the order of several days to a week. The climatology model may assume the atmospheric state is the same as its historical value for the same time of the year. In addition, the NOAA, for example, runs a numerical climate forecast called a coupled forecast system (CFS). The blending of outputs from two or more of the models using the system 100 may improve accuracy of the resulting forecast.

The multi-model blending applies to all outputs of a set of models. That is, for example, in the case of meteorology, there may be general purpose and application specific forecasts from a model. Thus, while a model may output (predict) wind speed, solar irradiance, temperature, air density, and humidity, for example, the model may additionally provide application specific forecasts such as wind power or solar power forecasts based on the wind speed or solar irradiance forecasts and other information (e.g., air density, temperature). The multi-model blending applies, as well, to the additional (application specific) outputs of the model.

Figure 5:
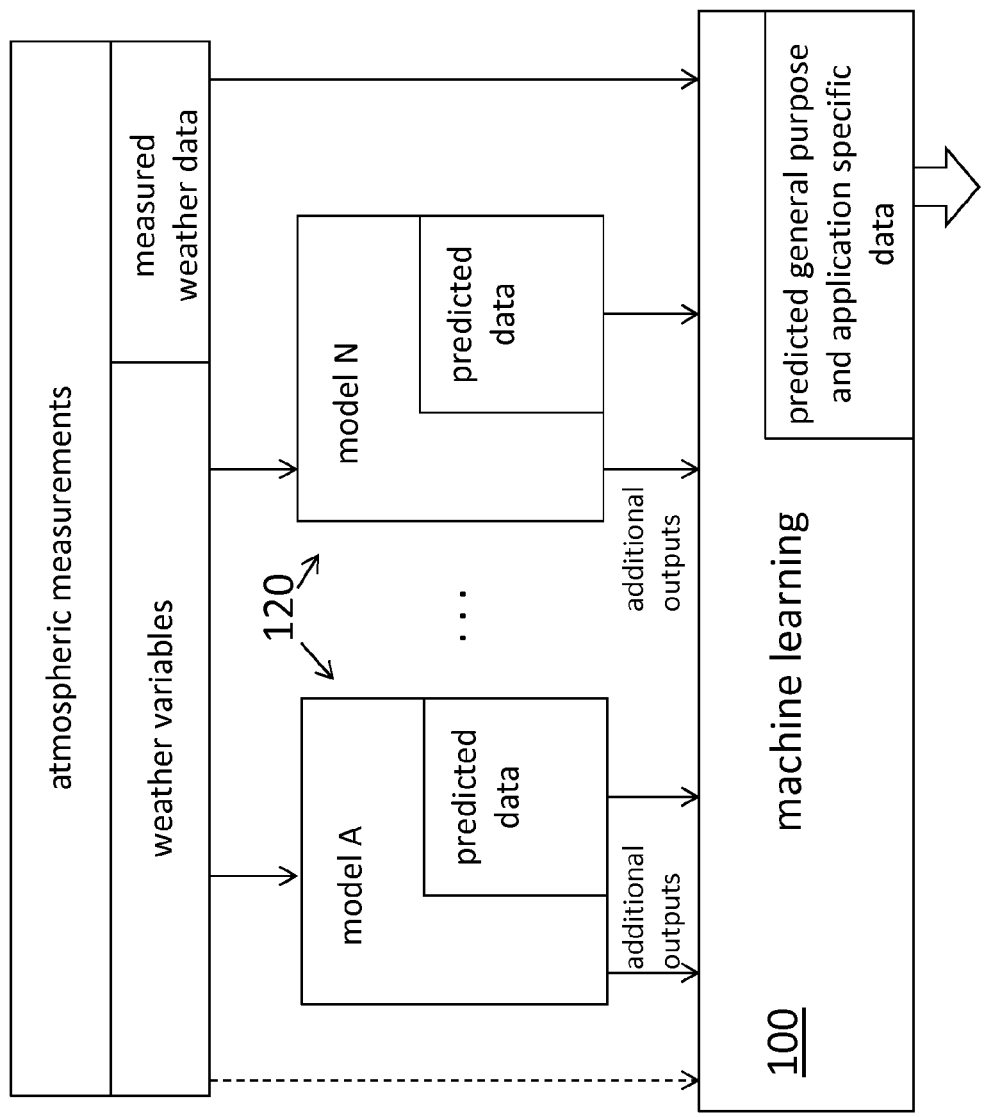
FIG. 5 illustrates multi-model blending data flow according to an exemplary embodiment of the invention.

FIG. 5 illustrates multi-model blending data flow according to an exemplary embodiment of the invention. The exemplary embodiment shown in FIG. 5 relates to general purpose and application specific data based on meteorological models (sources 120 A through N). As shown in FIG. 5, the assembly of training predictor variables in the multi-model blending system 100 includes an input of not only the desired prediction of each model (source 120) or the predicted data output from each model but also additional outputs of the models. That is, for example, even if the response variable is solar irradiance (solar power per unit area) whose measurement is available, other quantities (e.g., solar zenith and azimuth angles, cloud water content, surface temperature, surface rain) may also be included as predictor variables for the machine learning algorithm. Additionally, as indicated by the dashed line, the weather variables that may have been used as inputs by one or more of the models (sources 120) may also be used as predictor variables in the training data set. Although predicting these additional quantities is not of interest, these additional quantities effectively categorize the weather to facilitate generation of multi-model blending for different weather categories. While FIG. 3 was discussed above with specific reference to meteorological models, the sources 120 could, as well, provide outputs of corrosion models, and the relative reduction in error sigma when comparing the models' output to the blended output may be on the same order. Corrosion of pipelines in the oil and gas sectors or in the transportation or infrastructure sectors, for example, can result in significant cost and safety issues. Both internal and external corrosion is of concern. Pipeline corrosion typically manifests in the form of uniform corrosion or localized corrosion (e.g., pitting, crevice corrosion). Uniform corrosion is relatively easier to monitor, control, and predict. On the other hand, localized corrosion, and, specifically, pitting corrosion, contributes significantly to corrosion related failures. The numerous chemical, physical, and mechanical processes involved in predicting corrosion contribute to the complexity of accurate forecasting. For example, pipe corrosion is partially governed by the reaction kinetics of the surface electrochemistry of steel with carbon dioxide ($CO_2$) or hydrogen sulfide ($H_2S$) or both, other anodic and cathodic reactions, the water chemistry (protective scales, pH), partial pressures of gasses (e.g., $H_2S$, $CO_2$), temperature, flow conditions, local stress, and pipeline inclination. Other variables and materials that contribute to the complexity of corrosion behavior include pipe materials (e.g., carbon steel, stainless steel), primary fluid carried by the pipes (e.g., oil, gas, water), ionic constituents (e.g., [H+], [C+], [Fe++], pH), gasses and acids (e.g., $H_2S$, water ($H_2O$), $CO_2$, carbonic acid ($H_2CO_3$)), and physical parameters (e.g., gas/liquid phase mix, pipe stress, flow, temperature, pressure, Reynolds number).

One exemplary type of corrosion model is a corrosion science model that incorporates physical and chemical factors to predict uniform corrosion in sweet environments (e.g., $CO_2$ corrosion) or sour environments (e.g., $H_2S$ corrosion). Another exemplary type of corrosion model is an electrochemical model (electrochemical-passivity models, electrochemical-nucleation models) that incorporates the electrochemical reactions and their parameters that govern the different stages of the pitting process (e.g., formation of a passive film on the steel surface, initiation of pits at localized regions on the steel surface where the film breaks down, pit propagation and eventual penetration of the pipe wall). Electrochemical models require the execution of laboratory experiments. Thus, these models are difficult to validate even under laboratory conditions and are relatively impractical for field applications. Another exemplary type of corrosion model is a corrosion engineering (empirical) model that has been developed by determining the risk for pitting corrosion from field operation conditions, data obtained from inline inspection, and online monitoring techniques. Because field operation conditions are dynamic and differ from one pipeline segment to another, the applicability of corrosion engineering models cannot be extrapolated in time or space. This limitation may be overcome with machine learning. Other exemplary types of corrosion models include a semi-empirical model that includes corrections for base terms, a propagation model, a mechanistic model, and a statistical model. As noted with regard to the meteorological models, the blending of outputs from two or more of the corrosion prediction models using the system 100 may improve accuracy of the resulting forecast.

Figure 6:
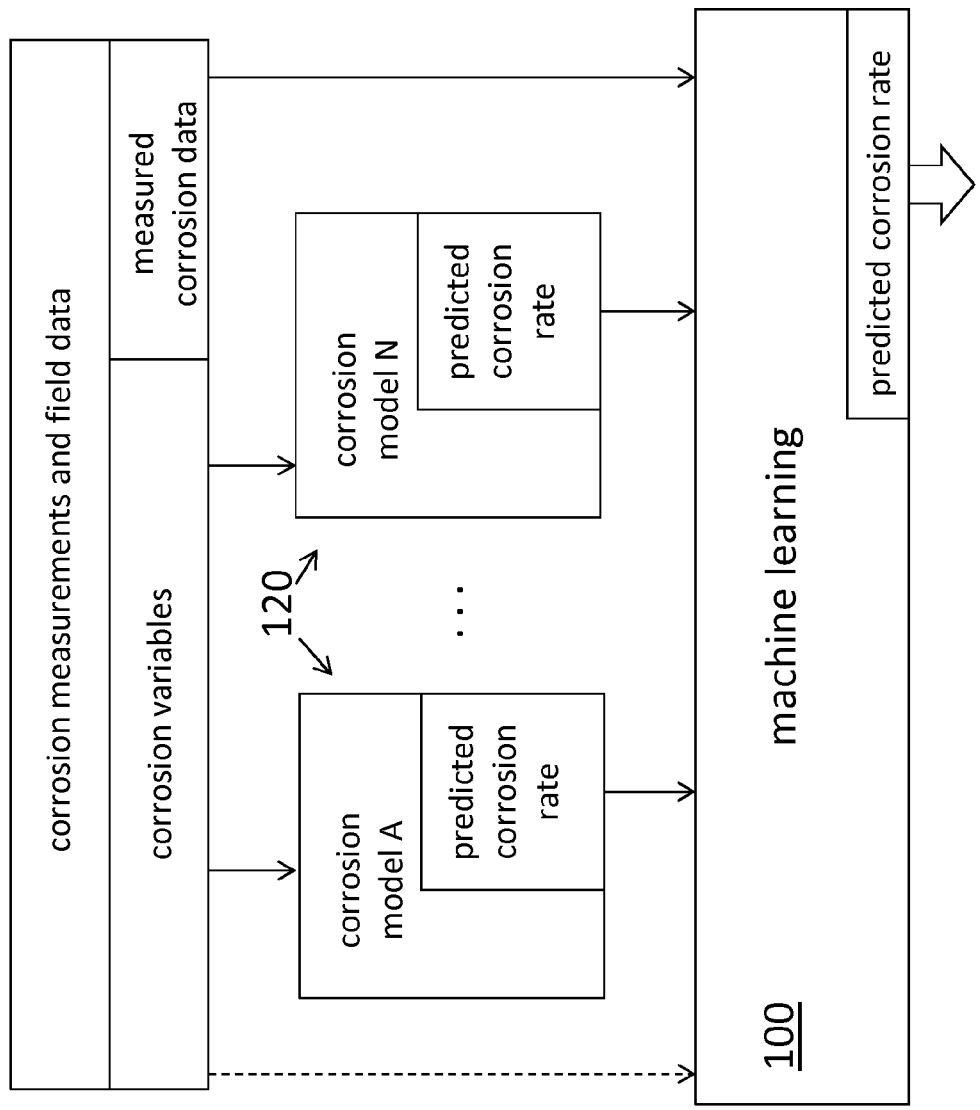
FIG. 6 illustrates multi-model blending data flow according to another exemplary embodiment of the invention.

FIG. 6 illustrates multi-model blending data flow according to another exemplary embodiment of the invention. The example relates specifically to the corrosion model blending discussed above. As shown, corrosion variables (e.g., pipe materials, physical parameters) are provided to some number of corrosion prediction models which act as the sources 120 (A through N) in this case. The outputs (forecasts) of these models are used as inputs to the multi-model blending system 100, which outputs a blended predicted corrosion rate based on the machine learning algorithm that was developed using historical predictions from the models and measured (actual) corrosion data according to the embodiments discussed above. In alternate embodiments, the corrosion variables used by the models (sources 120) may also be used by the system 100 in developing the blended model and, additionally or alternatively, in implementing the blended model.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of multi-model blending, comprising:
   obtaining, with a processing device, one or more sets of predictions of historical conditions, the historical conditions corresponding with a time T that is historical in reference to current time, and the one or more sets of predictions of the historical conditions being output by one or more models;
   obtaining actual historical conditions, the actual historical conditions being measured conditions at the time T;
   assembling a training data set including designating the one or more set of predictions of historical conditions as predictor variables and the actual historical conditions as response variables;
   training a machine learning algorithm based on the training data set; and
   obtaining a blended model based on the machine learning algorithm.

2. The method according to claim 1, wherein the assembling the training data set includes additionally designating one or more parameters as the predictor variables, the one or more parameters not being output by the one or more models.

3. The method according to claim 1, wherein the obtaining the one or more sets of predictions of the historical conditions includes executing the one or more models based on receiving historical measurements from one or more sources.

4. The method according to claim 1, wherein the obtaining the one or more sets of predictions of the historical conditions includes receiving the one or more sets of predictions of the historical conditions from one or more sources.

5. The method according to claim 1, wherein the training the machine learning algorithm includes training a neural network, linear regression model, generalized additive model, random forest model, gradient boosted regression model, or supported vector machine model and using supervised learning, unsupervised learning, statistical classification, association rule learning, hierarchical clustering, partitional clustering, reinforcement learning, or deep learning.

6. The method according to claim 1, wherein the one or more models forecast weather conditions and the blending outputs of the one or more models includes blending outputs of temperature, pressure, humidity, wind speed, global solar irradiance, direct normal solar irradiance, accumulated rain, or snow depth.

7. The method according to claim 6, wherein the blending outputs of the one or more models includes blending outputs of one or more of a Eulerian model, a Lagrangian model, a numerical weather model, or a climatology model.

8. The method according to claim 1, wherein the one or more models forecast pipeline corrosion and include a corrosion science model, electrochemical-passivity model, electrochemical-nucleation model, propagation model, corrosion engineering model, mechanistic model, or statistical model.

9. A system to perform multi-model blending, the system comprising:
   an input interface configured to receive inputs;
   a processor configured to obtain one or more sets of predictions of historical conditions based on the inputs, the one or more sets of predictions of the historical conditions being output by one or more models, to obtain actual historical conditions, the actual historical conditions being measured conditions at the time T, to assemble a training data set by designating the one or more set of predictions of historical conditions as predictor variables and the actual historical conditions as response variables, and to train a machine learning algorithm based on the training data set; and
   an output interface configured to output blended output based on a blended model resulting from the machine learning algorithm.

10. The system according to claim 9, wherein the processor assembles the training data set by additionally designating one or more parameters as the predictor variables, the one or more parameters not being output by the one or more models.

11. The system according to claim 9, wherein the inputs are historical measurements, and the processor obtains the one or more sets of predictions of the historical conditions based on processing the historical measurements with the one or more models, or each of the inputs is a set of the one or more sets of predictions.

12. The system according to claim 9, wherein the machine learning algorithm includes a neural network, linear regression model, generalized additive model, random forest model, gradient boosted regression model, or supported vector machine model using supervised learning, unsupervised learning, statistical classification, association rule learning, hierarchical clustering, partitional clustering, reinforcement learning, or deep learning.

13. The system according to claim 9, wherein the one or more models forecast weather conditions and output temperature, pressure, humidity, wind speed, global solar irradiance, direct normal solar irradiance, accumulated rain, or snow depth, and the two or models include two or more of a Eulerian model, a Lagrangian model, a numerical weather model, or a climatology model.

14. The system according to claim 9, wherein the one or more models forecast pipeline corrosion and include two or more of a corrosion science model, electrochemical-passivity model, electrochemical-nucleation model, propagation model, corrosion engineering model, mechanistic model, or statistical model.

15. A non-transitory computer program product having computer readable instructions stored therein which, when executed by a processor, cause the processor to implement a method of multi-model blending, the method comprising:
   obtaining one or more sets of predictions of historical conditions, the historical conditions corresponding with a time T that is historical in reference to current time, and the one or more sets of predictions of the historical conditions being output by one or more models;
   obtaining actual historical conditions, the actual historical conditions being measured conditions at the time T;
   assembling a training data set including designating the one or more set of predictions of historical conditions as predictor variables and the actual historical conditions as response variables;
   training a machine learning algorithm based on the training data set; and
   obtaining a blended model based on the machine learning algorithm.

16. The computer program product according to claim 15, wherein the assembling the training data set includes additionally designating one or more parameters as the predictor variables, the one or more parameters not being output by the one or more models.

17. The computer program product according to claim 15, wherein the obtaining the one or more sets of predictions of the historical conditions includes executing the one or more models based on receiving historical measurements from one or more sources, or the obtaining the one or more sets of predictions of the historical conditions includes receiving the one or more sets of predictions of the historical conditions from one or more sources.

18. The computer program product according to claim 15, wherein the training the machine learning algorithm includes training a neural network, linear regression model, generalized additive model, random forest model, gradient boosted regression model, or supported vector machine model and using supervised learning, unsupervised learning, statistical classification, association rule learning, hierarchical clustering, partitional clustering, reinforcement learning, or deep learning.

19. The computer program product according to claim 15, wherein the one or more models forecast weather conditions the blending outputs of the one or more models includes blending outputs of temperature, pressure, humidity, wind speed, global solar irradiance, direct normal solar irradiance, accumulated rain, or snow depth, and the blending outputs of the two or more models includes blending outputs of two or more of a Eulerian model, a Lagrangian model, a numerical weather model, or a climatology model.

20. The computer program product according to claim 15, wherein the one or more models forecast pipeline corrosion, and the blending outputs of the one or more models includes blending outputs of two or more of a corrosion science model, electrochemical-passivity model, electrochemical-nucleation model, propagation model, corrosion engineering model, mechanistic model, or statistical model.

* * * * *